Sept. 29, 1970 | J. H. KEFALAS ET AL | 3,531,322

PLATED SUPER-COAT AND ELECTROLYTE

Filed Dec. 28, 1966

INVENTORS
JOHN H. KEFALAS
JOSEPH A. LOYCANO
BY John J. McCormack
ATTORNEY

United States Patent Office 3,531,322
Patented Sept. 29, 1970

3,531,322

PLATED SUPER-COAT AND ELECTROLYTE

John H. Kefalas, Billerica, and Joseph A. Loycano, Bellingham, Mass., assignors to Honeywell Inc., Minneapolis, Minn., a corporation of Delaware Filed Dec. 28, 1966, Ser. No. 605,374
Int. Cl. G11b 5/72
U.S. Cl. 117—236 9 Claims

ABSTRACT OF THE DISCLOSURE

Multi-layered magnetic record surfaces having a non-magnetic nickel super-coat, electroless plated on the magnetic layer for protection against wear and corrosion, especially with non-metal substrates; also allowing superposition of identical magnetic layers with proper magnetic separation and for providing an etchable substrate strike for safer plating of discrete patterns of magnetic films. Also, methods and solutions for electroless plating such non-magnetic films by simple, convenient modifications of a reliable magnetic electroless plating method.

Background problems, invention features

Workers in the art of providing thin magnetic films for magnetic recording purposes are more and more confronted with wear problems; for instance, erosion of a magnetic film on tape by the Read/Write head "flying" just over it. Such workers are also familiar with prior art attempts to prevent their wear by applying super-coatings upon the magnetic film, such as by depositing a hard-alloy coating (e.g. of Chromium or Rhodium) or by oxidizing the film surface. Hard super-coatings, while apt for some purposes (such as for thin magnetic memory films), are quite impractical for use upon magnetic recording films, especially for "very-thin-film," "high bit-density" applications, since the Read/Write transducer head which must be "flown" only a miniscule gap above the film, may easily be eroded by a hard super-coating—something quite disastrous to the recording system. These problems, of course, will be greatly exacerbated with the advent of contact recording, now imminent. Further, such hard super-coatings are usually quite problematical to deposit upon thin magnetic films, especially when the latter residue on a non-metal (e.g. glass or plastic) substrate, as is often the case. That is, since these super-coatings are typically electro-deposited (e.g. electro-plated), and since the thin magnetic film on the non-metal substrate will likely exhibit an appreciable potential drop at its own (deposition) face, this can likely induce a super-coat deposition which is non-uniform in thickness and, in turn, which results in non-uniform magnetic properties (readout signal characteristics, etc.). Electro-deposition is thus unsatisfactory since it yields this non-uniform thickness at moderate current densities and, worse yet, burns the material at high current densities.

On the other hand, workers in this art are also familiar with prior art suggestions for super-coating magnetic films with soft, non-metallic (e.g. organic) substances, such as plastic, wax and the like, for related purposes, like reducing friction, etc. However, these organic super-coatings are quite unsatisfactory for modern magnetic recording surfaces, since they are all too soft and soon scraped off by the flying Read head or soon build up undesirable deposits on the head or on the record. The present invention alleviates the problem of head-to-record wear in a quite unexpected manner, by providing a super-coating that is neither very hard nor very soft relative to the magnetic film. Rather, the invention provides a "pseudo-film," which is a virtual duplicate of the magnetic film except that it is nonmagnetic. Such a "pseudo-film" shall have a metallurgy quite like that of the magnetic film (e.g. almost the same alloy) and, for many applications, also have somewhat the same thickness. Thus, in one form, the invention may comprise a non-magnetic like super-coat over a magnetic film. Moreover, where the aforementioned wear coatings of the prior art are either so wear-sensitive, on the one hand, as to allow the magnetic film to be eroded too quickly and thus degrade magnetic readout, or, on the other hand, are so thick as to significantly reduce readout signal strength; by contrast, the invention provides a super-film giving unexpected improvement in readout over a substantial part of the record life, as well as extending that life.

In particular, when applied over a thin, nickel-alloy magnetic film, non-magnetic nickel alloy super-coatings according to the invention have been observed to better than double the useful film life without the readout signal varying more than a few percent. Moreover, where a typical nickel-alloy thin magnetic film will become disastrously eroded after a few thousand runs past a magnetic test head (e.g. 10 microinches eroded per hundred thousand passes), when super-coated with a non-magnetic "pseudo-film" according to the invention, to about the thickness of the magnetic film (e.g. Ni-P or Ni-Co-P about 10 microinches thick), it is found, surprisingly, that the useful life of the magnetic film approximately trebles. Such protection is of high advantage in any case, but especially for ultra-thin, high bit-density films, since, quite obviously, a very slight erosion of such films, will drastically degrade their magnetic readout. As a result, where workers in the art have heretofore been loath to use such ultra-thin films in "severe-wear" applications, they can now do so with the invention. For instance, where a 20 microinch nickel-cobalt magnetic film has been observed to drop about ten percent in readout voltage after about one-half million passes against a prescribed test head, application of a 20 to 30 microinch non-magnetic nickel film thereover, according to the invention, has been observed to allow operating the test head about twenty times as long (about 7–10 million passes), before approaching such a drop in output. Another problem with thin magnetic film is corrosion. Films provided with a non-magnetic nickel wear-coating, or pseudo-film, such as aforementioned, have also exhibited a surprising improvement in corrosion resistance.

Workers in the art of depositing thin magnetic films are, naturally, interested in deposition (plating) techniques which offer greater economy and convenience. It has been observed that the aforementioned protective non-magnetic (nickel) super-coatings of the invention are also advantageous from a fabrication standpoint, in that they may be deposited with a relatively conventional bath for magnetic electroless plating with minor modifications—thus being convenient and economical. For example, a simple adjustment of a known electrolyte for plating a magnetic nickel alloy is all that is necessary to plate a like non-magnetic nickel super-film. The convenience of this technique, whereby a single basic electrolyte may be used for plating both the magnetic film and the protective "pseudo-film" coating thereon will be apparent to those skilled in the art.

In the course of plating such super-coatings, it was found practically impossible to plate onto an original "acid" plating (i.e. a film plated from an acid electrolyte) without making the super-coat electrolyte quite alkaline. Yet such alkaline electroless-plating has heretofore been impractical, e.g. because the electrolyte became so unstable. According to another fature of the invention a combination of chelating additives is taught for making such alkaline plating practical. Non-magnetic super-coatings, such as those afroementioned, may be used, according to another feature of the invention, together with underlying magnetic films to form plural superposed film pairs having unexpected advantages. That is, covering a first non-magnetic super-coating (overlying a first magnetic film) with a second magnetic film (like the first magnetic film), and then depositing a second non-magnetic super-coating (like the first super-coating) will form two superposed film pairs, each pair comprising superposed layers of non-magnetic material. Added film pairs may also be superposed. Plural composite layers like this are found to be surprisingly improved in magnetic properties, e.g. having much better overall magnetic recording characteristics. For instance, if the intermediate ones of these non-magnetic coatings are formed of "greater-than-coupling" thickness (but little more), they can allow vertical duplication of like magnetic layers to a prescribed large aggregate thickness and, thus, together can provide a "layered" record medium that better retains magnetic signals without degradation by the "thickness demagnetization" that typifies thick magnetic films. Moreover, it will be apparent to those skilled in the art that a further advantage of such layered records is that, for cases where plating voids ("dropouts") are likely to occur, the provision of such superposed plural magnetic layers practically guarantees that such a dropout in any one film will not likely prevent magnetic recordation at that (dropout) situs.

According to yet another feature of the invention, non-magnetic (nickel) coatings, like those aforedescribed, can be plated directly upon a substrate, such as on a non-metal (plastic) web to facilitate the plating of discrete magnetic film patterns thereon. It has long been desirable to plate discrete magnetic films upon a substrate using the convenient photoresist techniques and etchants such as are now commonly used in printed circuit fabrication. However, it is problemmatical to so etch thin magnetic films, since this often changes the film's magnetic properties undesirably, and unpredictably. The invention provides an answer to this problem, teaching the deposition of a non-magnetic "strike" coating upon a substrate, using conventional photoresist/etching techniques to pattern the strike discretely, then depositing (plating) the magnetic film to adhere only upon the remaining, patterned strike-portions. Alternatively, one may plate a continuous strike, then plate a continuous magnetic film on the strike, next plate a continuous non-magnetic supercoat on the film and, then, apply the photoresist and etching techniques. As will be explained hereinafter, the latter technique protectively "sandwiches" the magnetic film between non-magnetic material, above and below, so that the film is substantially unaffected by etching.

It is, therefore, an object of the present invention to provide a thin non-magnetic protective coating for protecting thin magnetic films and to provide methods for plating such. A related object is to provide plated thin magnetic recording films with associated "non-magnetic" coatings having a different magnetic characteristic and to teach methods of fabricating these. A more particular object is to provide "non-magnetic" nickel super-coatings for such magnetic films and teach methods for electroless-plating such super-coatings to protect such films against wear and corrosion, to improve readout therefrom by resolving demagnetization and dropout problems and to define the location of discrete magnetic deposition patterns, especially upon non-metal substrates. Another object is to protect such magnetic films against abrasive wear, simply by depositing a similar, but non-magnetic, coating thereon. Still another object is to protect such magnetic films of the nickel alloy type by depositing thereon a low-permeability, nonmagnetic nickel film of a few microns thickness and being unresponsive to the magnetic recording for which the magnetic films are designed. Still another object is to electroless plate such a non-magnetic coating from a bath which is also adaptable for plating the magnetic film.

Yet another object is to provide such a thin, non-magnetic, wear-coating adapted, additionally, for resisting corrosion. A still further object is to adapt very thin magnetic recording films for use in highly abrasive, high-wear environments simply by providing a thin, non-magnetic super-coating thereon which super-coating has a wear-rate matched to that of the magnetic film. Still another object is to protect thin films from abrasion, corrosion and the like simply by electroless plating a super-coating thereon which is metallurgically similar except for being nonmagnetic. A related object is to so protect films by depositing thereon a non-magnetic nickel alloy film.

A still further object is to protect a thin electroless-plated magnetic nickel alloy film of a few microinches thickness from wear, corrosion and the like, without significantly degrading the magnetic readout properties thereof, by electroless plating thereon a similar, though non-magnetic, nickel alloy film of similar thickness. Still another object is to provide such a non-magnetic protective eelctroless plating simply by modifying the bath for plating the said magnetic film to plate a non-magnetic relatively low permeability film, such as by changing the ratio of plating ions.

Still another object is to provide such a non-magnetic protective coating upon, and between, each of several superposed thin magnetic films to thereby form a stack of separate, like magnetic film layers and so improve magnetic readout properties, eliminate dropout problems and the like. Still another obejct is to provide such a non-magnetic protective coating directly on a substrate surface for etching discrete-film patterns and providing discrete magnetic film patterns without harming the magnetic film. Still another object is to provide such a non-magnetic coating in a discrete pattern upon a non-metal substrate to facilitate discrete plating of magnetic films thereon.

The above and other objects, features and advantages will be apparent to those skilled in the art from the following description of the invention which is intended to enable any person skilled in this art to make and use the invention and which sets forth embodiments comprising the best mode for carrying out the invention.

Thus, according to a preferred embodiment of the invention, a first thin magnetic nickel-cobalt type film is electrolses-plated a few microinches thick upon a non-metal, non-magnetic substrate and, upon this film, a second similar, but non-magnetic, nickel alloy film of relatively low permeability and relatively the same thickness and metallurgy as the first film is electroless-plated on the first film, sufficient to provide a composite coating having a substantially extended wear-life without significant degradation of magnetic readout during this life and with good corrosion resistance.

As a further particular embodiment, such a composite magnetic/non-magnetic coating is duplicated vertically by depositing the non-magnetic and magnetic films alternately in pairs a number of times to thereby form a "layered" magnetic record having greatly improved magnetic readout properties, having decreased sensitivity to thickness demagnetization, having decreased dropout sensitivity, and the like. Additionally, such a composite layered magnetic record may be treated with relatively conventional photoresist etching processes to provide a discrete pattern of magnetic film without etching damage to the magnetic material.

In the drawings, wherein like reference numerals denote like parts:

Figure 1:
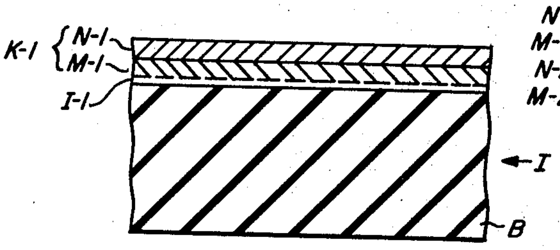
FIG. 1 shows in fragmentary, sectional, schematized form, a magnetic film deposited upon a substrate and super-coated with a non-magnetic layer according to the invention.
Figure 3A:
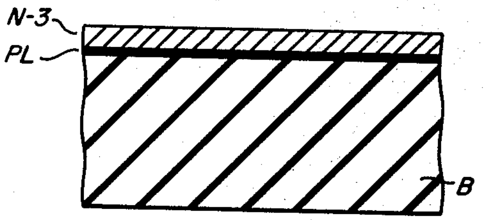
Figure 3B:
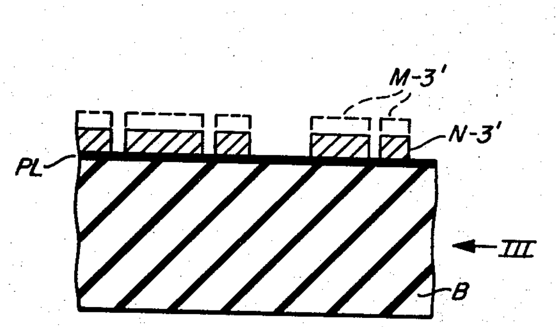
Figure 4A:
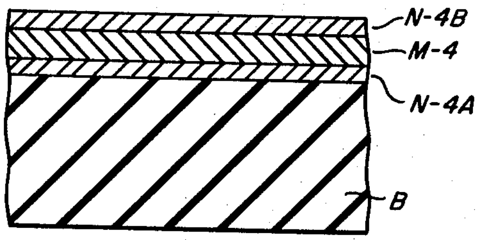
Figure 4B:
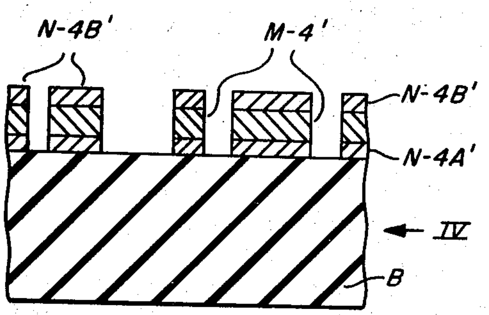
Figure 5:
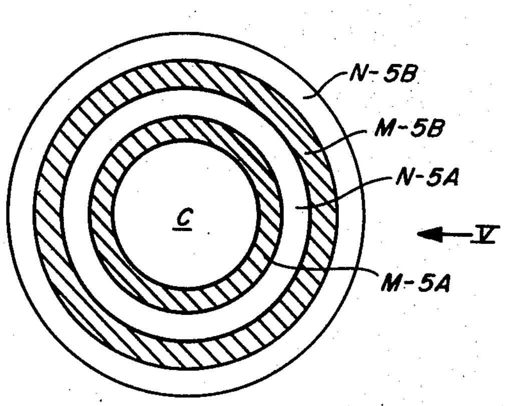

FIGS. 3A and 3B, after the manner of FIG. 1, and as another alternate embodiment, indicate, respectively, a non-magnetic deposit directly upon a substrate, however with an adhesive on the substrate, and after subsequent etching of this deposit into a discrete pattern, the discrete super-deposition of a magnetic film;

FIGS. 4A and 4B, after the manner of FIG. 1, and as an alternate arrangement to that shown in FIGS. 3A and 3B, indicate, respectively, a first non-magnetic substrate (strike) coating on which is deposited a magnetic layer, on which, in turn, is deposited a second non-magnetic "super-coating," this composite tri-layer coating having been subsequently etched-through into a prescribed discrete film pattern in 4B; and FIG. 5, after the manner of FIG. 2, though cross-sectionally, shows a similar layered arrangement of coatings, however deposited on a cylindrical wire substrate.

By way of example, we will now discuss our invention in light of specific processes for electroless-plating a protective coating upon thin magnetic films, as indicated in examples below. However, it will be understood that these examples do not, in themselves, limit the invention to the precise conditions, ingredients, applications or the like as mentioned, but rather indicate propaedeutic embodiments enabling those skilled in the art to practice the best mode of the invention as defined within the scope of the appended claims, as well as suggesting suitable equivalents thereto.

Plating method

We will first discuss our invention in light of a thin magnetic nickel-cobalt-phosphorous film plated upon a substrate for magnetic recording. It will be observed that one especial advantage of protective films according to the invention is that they facilitate convenient fabrication, i.e. with minor modifications of a known electrolyte for plating the magnetic film, one may electroless-plate the protective "pseudo-film." Thus, in Example I below are listed the essential constituents and conditions for electroless-plating such a thin magnetic film upon a non-magnetic (polymer web) substrate together with preferred values and ranges.

EXAMPLE I

A thin nickel-cobalt-phosphorous magnetic film is electroless-plated on a very smooth, gel-coated plastic web (e.g. a polyethylene terephthalate like "subcoated Cronar" by Du Pont) pretreated as known in the art by sensitizing etc. This plating will be to a thickness of about 20 microinches, using the following preferred aqueous electolye and plating conditions for a plated film coercivity of about 450 Oe.:

BATH A

Temperature: 78° C. (65–95)
pH: 8.5 (7.5–9).
Plating Time: 1–10 minutes (for from about 1–100$\mu$-in. thickness).
Ni/Co ratio or magnetic characteristics (e.g. 30 Ni-60 Co as one magnetic plated alloy).

| | Optimum (gm. L.) | Range (gm./L.) |
|---|---|---|
| $CoCl_2.6H_2O$ | 20 | (10–30) |
| $NiCl_2.6H_2O$ | 12 | (3–30) |
| $NaH_2PO_2.H_2O$ ("Hypo") | 20 | (5–50) |
| $NH_4Cl$ | 13 | (5–50) |
| Rochelle salt | 15 | (0–100) |
| Ferrous ammonium sulfate (to stabilize) | 1 | (0.2–5.0) |
| Potassium hydroxide to adjust pH | about 30 | (20–40) |
| Citric acid (add last!) | 20 | (5–70) |

This electroless-plated film is formed, as understood in the art, to have magnetic properties conventionally determined by alloy composition, by film thickness (e.g. very thin—about 10 $\mu$-in. or less—for high bit-density recording) and by other known parameters.

The so-called magnetic film is next coated with a protective "pseudo-film" coating according to the invention by electroless-plating non-magnetic nickel-phosphorous with the following indicated aqueous Bath B and under the following conditions:

EXAMPLE II

Temperature: 70° C. (40–95).
pH: 9.0 (7.5–10).
Plating Time: 1–20 min. (or from about 10-200$\mu$-in. thickness).
Similar commercially available solution with acid pH is: Enthone "Enplate 410A and B."

| | Optimum (gm./L.) | Range (gm./L.) |
|---|---|---|
| $CoCl_2.6H_2O$ | 0 | [1] (0–30) |
| $NiCl_2.6H_2O$ | 12 | [1] (2–30) |
| $NaH_2PO_2.H_2O$ (Hypo) | 25 | (10–50) |
| $NH_4Cl$ | 13 | (5–50) |
| Rochelle salt | 15 | (0–100) |
| Citric acid (add after the above) | 20 | (5–70) |
| Ferrous ammonium sulfate for stability | | |

[1] Total ½ amt. hypo or less.

Of course, this "pseudo-film" coating will be plated to a thickness consistent with adequate readout, yet thick enough to provide the extended wear-life desired. For instance, after plating a magnetic nickel-cobalt film as indicated in Example I to a thickness of about 20 microinches, a non-magnetic nickel-phosphorous pseudo-film of about 5–30 microinches thickness will provide good protection. That is, such a coating will give adeaquate readout over a wear-life many times that of the magnetic film alone under typical Read/Write operation with a given magnetic tranducer head. For evaluation purposes, test loops of magnetic tape were compared, a test group having a plated magnetic coating in various thicknesses (metallurgically-identical to that indicated for Example I) and a "control" group, conventionally (magnetic) oxide-coated. All tapes were subjected to a prescribed test condition, i.e. were driven in operative relation with a prescribed test head, a prescribed (controllable) force being provided to press the tape against the head. A "useful life" value was determined for each tape, being defined as the time required for the magnetic readout signal to drop by about 10%. It was found (and confirmed by reproducible test results) that the plated tape outwore the oxide tape by more than an order of magnitude, having a useful life increase of up to ten times and more. For instance, about 20 microinches of non-magnetic nickel plating was found to give a wear-resisting "useful" life of about six million passes—a hitherto unheard of life! Of course, in any event, "oxide" tape is inferior to plated tape for magnetic recording, since, even when protected with a wear-coating, it has virtually no resistance to head-impact damage, to tearing, gouging or the like.

Surprisingly, the non-magnetic overcoating did not appreciably interfere with readout from the underlying magnetic film, even at a full supercoating thickness of 20 $\mu$-in. That is, the readout loss (due to head/record separation), tested at about 5000 bit/in. for a signal with about 200 $\mu$-in. bit length, was well within today's 6 db limits of acceptability.

As an important feature of the invention, we have noticed that in many cases this non-magnetic nickel "pseudo-film" plates, at best, poorly, and often not at all, onto a "like-pH" type plating, i.e. for example, an acidic form of Bath B (like the aforementioned "Enplate 410–A") is ineffective to plate onto a magnetic film which was plated from an acidic electrolyte. This problem is aggravated by the observed fact that few, if any electrolytes will plate non-magnetic nickel except at a rather low acid pH. For instance, using the aforementioned "Enplate 410–A" the plating is typically slightly magnetic within the specified "working pH" down to about 4.0; however, pH must be reduced to about 2.5–3 for a non-magnetic plate. Furthermore, no known electrolytes will plate non-magnetic nickel at alkaline pH without addition of enormous quantities of "hypo," but, this, in turn, increases the plating rate and idnuces decomposition and bath instability—to the point where all known alkaline electrolytes are impractical for this purpose. The invention provide such an alkaline electrolyte.

That is, as an important feature of the invention and of electrolytes, like Bath B, for electroless-plating non-magnetic nickel alloys at alkaline pH, we have found that use of two chelating agents in combination, namely ammonium chloride and citric acid, preferably together with Rochelle salt, permits such plating. It is believed these additives allow this because they so greately improve bath stability at the high pH levels involved.

For purposes of illustration, there is shown in FIG. 1 a substrate B comprising a flexible plastic web B, coated with gel. or a similar surfacing layer, as suggested at I–1 (in phantom to allow for various amounts left after plating). Web B has a thin continuous magnetic film M–1 deposited thereon, (e.g. in the manner of Example I). Alternatively, a glass (disc) substrate may be used and surfacing layer I–1 omitted. Also shown is a non-magnetic super-coating N–1, understood to be electroless-plated on magnetic film M–1, e.g. according to Example II. For purposes of comaprison (such as with FIGS. 2 through 4), it may be assumed that web B is relatively thick (e.g. from about 4–14 mils), relative to layers M–1, N–1, which may characteristically be about 20 micro-inches thick. (Drawings not to scale.)

It is a feature of the above, non-magnetic, plating Bath B, that it may be advantageously operated at a relatively low bath temperature, such as about 40° C. compatible with substrates of temperature-sensitive plastic. Such plastics cannot tolerate the heat of oxidation treatments. Another advantageous characteristic of Bath B is that it plates non-magnetic nickel from an alkaline solution (pH can be well over 7.0); whereas conventional electroless nickel plating solutions are acidic, typically operating at a pH of about 4.0. Consequently, Bath B, or an equivalent, is able to efficiently plate a non-magnetic (Ni-P) super-coat on a Permalloy (Ni-Fe) plated magnetic film (such as on a wire); whereas the typical prior art acid bath will not do so, but rather will deplate the Permalloy film.

Permalloy plated wires hav been electroless-plated according to Example II with a thin Ni-P super-coating (also of FIG. 5 and description thereof) with gratifying results, including surprisingly stabile magnetic properties. For instance, after a severe aging treatment, no deterioration of magnetic properties was detected—something most unusual in the art!

The simplicity of the invention as to its method of plating such a "pseudo-film" will be apparent to those skilled in the art. For instance, in comparing Example II with Example I, it will be apparent that Bath A is, with a few minor adjustments, the same as Bath B and can be used (for instance, on-line therewith), "as-is" in a following tank (with appropriate rinses, etc. also), simply making the minor adjustment of changing bath Ni/P ratio (to change the magnetic permeability of the plated alloy). For instance, simply dropping the pH from about 10 to about 8.5 is observed to effect such a change when the $Ni/H_2PO_2$ ion ratio is close to a low, "transition" value.

As a feature of the invention, note that the protective coating is matched in hardness and abrasive characteristics to that of the underlying magnetic film, being neither much more nor much less abrasive (against a magnetic transducer head) and, being adapted to have a metallurgy, and a thickness, sufficient to wear against the head at a rate roughly matched to that of the underlying magnetic film (similar transducer-eroding properties).

It will be apparent to those skilled in the art, however, that other equally convenient analogous adjustments may be made to similarly render the plated pseudo-film "non-magnetic," i.e. so it is not responsive to prescribed recording system, unlike the "magnetic" film having a prescribed responsive magnetic recording characteristic. For instance, the electroless-plating method as summarized in Example III may be used instead of that in Example II to nonetheless produce a similar plated pseudo-film. Further, such a non-magnetic nickel coating may be plated from a different bath, though the aforementioned advantages of convenience, etc. will be lost. Thus, an acidic bath such as Enplate 410–A, or 410–B, (by Enthone Co.) may be used. It will be appreciated that other alloys may be electroless plated for this purpose in some cases, such as copper, cobalt, or the like, especially where the wear-properties thereof are relatively the same as the magnetic film and thus will affect transducer heads no more damagingly.

EXAMPLE III

The bath constituents and conditions of Example II are followed except that, to make the plating more non-magnetic, pH is adjusted to 8.5, bath temperature to about 55° C., and the concentration of Hypo is adjusted to thereby increase the $H_2PO_2$/Ni, Co ion ratio, thereby greatly decreasing the proportion of cobalt in the plated alloy.

Although the above processes have been described for plating upon a polymer web substrate, it will be evident to those skilled in the art that they are also apt for plating on other substrates, such as the aforementioned wire, as well as discs, drums and the like. For instance, substrates of copper, aluminum, glass, or other non-magnetic materials may be used. Of course, suitable preconditioning steps will often be employed with other substrates, as understood in the art. Similarly, although the "pseudo-film" non-magnetic super-coating has been described for use with an electroless-plated nickel-cobalt-phosphorous film, it will be apparent that it is adaptable for other thin magnetic alloy films, electroless-plated or otherwise deposited. Of course, there are special added advantages when the pseudo-film comprises a modified version of the magnetic film alloy, such as aptness for use of a common basic plating bath, etc.

LAYERED STRUCTURE

According to another feature of the invention, a layered magnetic record, similar to that plated according to Example I, but with many, rather than one, pairs of magnetic/non-magnetic coatings. Such a "layered" record is indicated at II in FIG. 2 and may be fabricated by depositing over the non-magnetic super-coat N–1 of record I (FIG. 1) a second magnetic film (M–2B) and then, a second non-magnetic coating (N–2B) deposited on this. This second super-coated magnetic film (M–2B) will be understood as similar to the first (here M–2A and comprising an identical thin film of electroless-plated Ni-Co-P). The magnetic films will thus be separated by a non-magnetic coating layer (N–2A) of prescribed thickness. The magnetic films will have substantially the same magnetic properties and the same thickness (e.g. about 10–20 micron-inches), while the non-magnetic layers may comprise the aforementioned non-magnetic Ni-P or a like non-magnetizable (low permeability) metal (e.g. Copper) having a thickness (e.g. about 10 micro-inches) greater than that which would "magnetically couple" the films, as such is generally understood in the art. Thus, it is intended that prescribed magnetic signals are intended to be recorded as vertically-registering duplicates. This will insure that plating dropouts (film voids) in any one magnetic film will not prevent recording of a signal (on another magnetic film) at that location. Also, the magnetic films will serve to reinforce one another to provide a stronger, aggregate readout signal.

Figure 2:
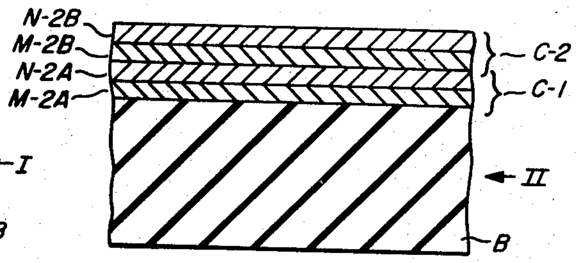
FIG. 2 shows an alternate embodiment, after the manner of FIG. 1, the magnetic film and non-magnetic supercoating being alternately duplicated to form a composite layered record.

Thus, in summary, the "layered" (vertically duplicated) magnetic record schematically illustrated in FIG. 2 comprises a first magnetic film M–2A deposited upon a non-metal substrate B and the non-magnetic metal coating N–2A (similar to N–1 of FIG. 1) is electroless-plated thereon, the two films comprising a first composite record layer (recording plane) C–1. To achieve the magnetic "layering," the second magnetic film M–2B, substantially identical to initial magnet film M–2A, is deposited (electroless plated) on non-magnetic coating N–2A, and then, a second, non-magnetic "super-coat" N–2B is electroless-plated on film M–2B, the latter two comprising a second composite record layer C–2. Layers C–1, C–2 make up "layered" record II. Of course, further successive composite record layers may be superposed within the limitations of magnetic readout capability, overall thickness and the like, as known in the art. Magnetic films M–2 may typically be about 15 microinches thick. Intermediate non-magnetic film N–2A (all such) should be too thick to magnetically "couple" films M–2, but, for efficiency, not substantially thicker, being, for instance, about 5 microinches. Exposed non-magnetic 'super-coat" N–2B will be thick enough to provide the prescribed wear-life and on the order of magnitude of films M–2, typically being about 10 microinches.

Of course, for further magnetic signal reinforcement, additional magnetic layers may be used, all being separated by the same kind of non-magnetic, non-coupling intermediate layers. It will be recognized that this arrangement is quite distinct from "magnetically coupled" films where, unlike here, the magnetic layers have very different magnetic properties and must be separated no more than a prescribed "coupling-distance." It will be apparent for the embodiment of FIG. 2 (and also the other embodiments) that the coatings may also be deposited on different substrates; e.g. upon such "memory substrates" as wire, rod or thin film memory surfaces. It will be apparent that, although wear-resistance will not be as important in such memory applications as with a magnetic recording film, corrosion protetcion and the like will never-the less be quite important.

Such memory films have many problems associated with corrosion (e.g. aging effects) that the thin non-magnetic nickel-phosphorous super-coat can alleviate. A "layered" magnetic record configuration like record II in FIG. 2 is indicated at V in FIG. 5 for a wire substrate C intended to illustrate to those skilled in the art how the foregoing features of invention may also be applied to magnetic wire memory configurations. Up to the present time, one of the important practical limitations upon employment of magnetic wire memory units for many applications has been the limited amplitude of the output signal. That is, because of the typically small wire diameter, magnetic material coated thereon must necessarily be limited in thickness and volume. Large thicknesses are not practical because of the formation of "domain walls" which, in turn, affects the value of "disturb current" and of "adjacent bit interference." Because of such limitations, many workers prefer to keep magnetic film thicknesses (on wire) below a maximum of about 0.95 to 1.0 microns. Larger thicknesses have been plated but even though the signal level is high, adjacent bit interference is so large that the effective output drops to low, useless levels.

Thus, it is recommended that according to the invention, multiple superposed layers of thin magnetic film be plated on such wires, interspersed with non-magnetic layers to form a "layered" wire record similar to the layered planar array of FIG. 2. For instance, as indicated in FIG. 5, a substrate wire C, such as a copper wire of about 5 mils diameter, is indicated as plated with two thin superposed magnetic films M–5, separated by a non-magnetic layer N–5, though, as before, further non-magnetic/magnetic layers may be superposed. Magnetic layers M–5 comprise coatings of like magnetic material (e.g. with substantially the same thickness, magnetic characteristics, etc. as in FIG. 2) embodiment plated on core C to a thickness of from about 0.5 to 1.0 microns so as to allow no appreciable adjacent bit interference or the like. Separating layer N–5A comprises a non-magnetic metal, such as copper, non-magnetic nickel or the like plated to a thickness sufficient to prevent coupling between magnetic films M–5, for instance, from about 0.5 to 5.0 microns. Preferably, a second outer non-magnetic super-coating N–5B is also provided, e.g. to prevent corrosion.

Many advantages will occur to those skilled in the art from so depositing a layered magnetic film arrangement on a wire substrate. For instance, as with the aforementioned planar layered arrangement, the dropout problem, which is especially burdensome in continuous wire plating, may be virtually eliminated. Also, because of the possibility of using thinner magnetic film, an increase in coercivity and increased readout amplitude may be realized, without using the aforementioned undesirable thick films. Such a layered configuration can give the advantages of very thin magnetic films (e.g. regarding dispersion, skew and adjacent bit interference) without the usual disadvantages, as aforementioned, of low readout signal level, dropout problems or the like.

According to another feature of the invention, and as suggested above, non-magnetic coatings, such as the aforedescribed non-magnetic nickel phosphorous of Examples II and III, may also be electroless-plated directly upon a non-magnetic substrate to facilitate the plating thereof of discrete patterns of magnetic films. Such applications are indicated in FIGS. 3 and 4 wherein a non-magnetic, non-metallic substrate B (e.g. a plastic polyethylene terephthalate web) is electroless-plated with a thin non-magnetic nickel coating (N–4A in FIG. 4A; N–3 in FIG. 3A) to derive discrete magnetic record devices (III and IV, respectively). Of course, equivalent non-magnetic coatings such as copper, gold, etc. may be substituted within the skill of the art. As with substrate B in FIG. 1, and according to another feature of the invention, substrate B in FIG. 3 may be super-coated with a plating adhesive layer PL, such as a gel or like water-permeable colloid material, to facilitate electroless-plating thereon of this non-magnetic layer N–3. According to this feature of the invention, continuous non-magnetic layer N–3 in FIG. 3A may then be treated to assume a prescribed discrete pattern, as is indicated at N–3′ in FIG. 3B, such as by applying photoresist, selectively developing it and subsequently immersing it in an etchant, as well known in the art. Having thus formed non-magnetic segments N–3′ according to the prescribed pattern to be assumed by the magnetic film, these segments may then be conveniently plated upon, such as by immersion in an electroless plating solution (e.g. according to Example I) for deposition of discrete magnetic film pattern M–3′ (phantom). It is observed that such plating will take place only upon patterned segments N–3′ (i.e. only above "image-portions" of B) and not on the non-metal substrate B, or on any surface colloid layer PL (if such remains after etching). It will be apparent that, quite advantageously, such a discrete magnetic pattern is thus formed without exposing the magnetic material M–3′ to damaging etchants, although the convenience and reliability of using conventional photoresist-etching techniques may still be derived.

FIG. 4 indicates a modification of the technique illustrated in FIG. 3, wherein non-metal substrate B is plated with a continuous non-magnetic (e.g. Ni-P) layer N–4A, on which is deposited (electroless-plated) a continuous magnetic film M–4 and on which, in turn, is deposited (electroless-plated) a second non-magnetic super-coat N–4B, all three layers being relatively the same order of thickness (e.g. up to a few microns, as with the deposit layers in FIG. 2).

According to this feature of the invention, and as a modification of the technique for forming discrete record III in FIG. 3B, the composite coating N–4A/M–4/N–4B, may then be treated with the same conventional photoresist etching discrete pattern forming steps, the etchants thus attacking the composite record to form the discrete composite layered record IV, comprising layered sections N–4A′/M–4′/N–4B′. It will be apparent that non-magnetic layers N–4′ will thus protect the upper and lower faces of the remaining intermediate (sandwiched) magnetic film sections M–4′, so that the latter are substantially unaffected by the etchants.

Workers in the art will appreciate that the foregoing plating methods may be modified as to deposited magnetic materials, substrate, plating steps, and the like to equivalently achieve the results derived by the invention as described and claimed. Likewise, the above-described magnetic recording films may be modified as to substrate, magnetic metals, non-magnetic metals, number and arrangement of magnetic film and non-magnetic coating layers, fabrication methods and the like, without departing from the scope of the claimed invention.

Other applications for the invention will be evident from the above description and the invention should not be considered as confined to the exemplary embodiments described. While the invention has been particularly shown and described with reference to the foregoing preferred embodiments, it will be understood by those skilled in the art that various changes in form and details in constituent and steps in concentrations and in ranges may be made without departing from the spirit and scope of the claimed subject matter.

What is claimed is:

1. A method of making a magnetic record member that operates in conjunction with a transducer movable relative to the record member for writing information into the record member for storage therein and/or for reading stored information from the record member, said method comprising the steps of (a) providing a first metallic magnetic memory layer on a substrate to a thickness and with metallurgical content and with magnetic storage properties for operating with said transducer, and (b) providing an outer first metallic protective layer covering said memory layer and adhered thereto to intervene between the memory layer and said transducer and thereby protect said memory layer from contact with said transducer, said last-named step providing said protective layer (i) with metallurgical content similar to that of said memory layer except as regards said magnetic storage properties, (ii) with a thickness of the same order of magnitude as the thickness of said memory layer, and (iii) with a magnetic characteristic, including a low permeability relative to that of said memory layer, such that said protective layer is devoid of magnetic storage properties that are responsive to said transducer.

2. The method defined in claim 1 comprising the further steps of (a) providing a second magnetic memory layer covering said substrate and adhered thereon underneath said first memory layer, with said second memory layer being substantially identical metallurgically to said first memory layer and coextensive therewith, and (b) providing a second protective layer covering said second memory layer and adhered thereon contiguously under said first memory layer, with said second protective layer being substantially identical metallurgically to said first protective layer and coextensive therewith.

3. The method defined in claim 1 comprising the further step of selectively configuring said layers to form discrete recording tracks thereof spaced apart from each other by nonmagnetic material and with said protective and memory layers being in register with each other in each said recording track.

4. The method defined in claim 1 in which (a) said memory layer providing step includes electroless plating said memory layer onto said substrate from a first electroless plating electrolyte and (b) said protective layer providing step includes electroless plating said protective layer onto said memory layer from a second electroless plating electrolyte differing from said first electrolyte substantially only with regard to constituents that provide said magnetic properties to said memory layer.

5. The method defined in claim 1

(a) in which said step of providing said memory layer provides a layer consisting essentially of nickel alloyed with another metal, and (b) said step of providing said protective layer provides a layer consisting essentially of nickel alloyed with at least one metal different from the metal alloyed with nickel in said memory layer.

6. The method defined in claim 2 in which said steps of providing said memory layers provides layers of substantially the same thickness, and in which said steps of providing said protective layers provides layers of substantially the same thickness.

7. The method defined in claim 1

(a) in which said step of providing said magnetic layer includes (1) providing a first aqueous electrolyte bath comprising nickel source ion material, cobalt source ion material, sodium hypophosphite, Rochelle salt, ammonium chloride, citric acid, and having a pH substantially between 7.5 and 9, and (2) electrolessly plating said memory layer onto said substrate from said first electrolyte, and (b) said step providing said protective layer comprises the steps of (1) providing an aqueous electrolyte having nickel source ion material, sodium hypophosphite, Rochelle salt, ammonium chloride, citric acid and having a pH substantially between 7.5 and 10, and (2) electrolessly depositing said protective layer onto said memory layer from said second electrolyte.

8. The method defined in claim 1 in which said step of providing said protective layer includes electroless plating said protective layer from an aqueous alkaline electrolyte including a major portion of nickel alloy source ion material, sodium hypopohosphite, and citric acid and ammonium chloride in a quantity sufficient to accommodate said source ion material and provide bath stability.

9. The method as recited in claim 1 wherein both said layers are plated from relatively the same type electrolyte; wherein are also particularly included the steps of:

selecting a non-magnetic plastic substrate web having a gel coating on recording surface portions thereof; sensitizing said gel-coated surface portions by stannous and palladium immersions; immersing said sensitized recording portions in a prescribed first electrolyte sufficient to electroless deposit a magnetic nickel alloy of about a few microinches thick; and thereafter immersing said magnetic plated surface portions in a second electrolyte sufficient to electroless plate a non-magnetic nickel-alloy otherwise similar to said magnetic alloy plating, both said electrolytes comprising aqueous baths that are relatively similar in constituents and treatment except for magnetic parameters; and wherein said electrolytes comprise aqueous alkaline solutions including a first portion of sodium hypophosphite, Rochelle salt, ammonium chloride, citric acid, and a second portion of nickel source ion material selected from nickel material and nickel and cobalt materials, said second portion comprising about one-half said first portion or less, sufficient to maintain said protective layer non-magnetic.

References Cited

UNITED STATES PATENTS

| | | | |
|---|---|---|---|
| 3,141,744 | 7/1964 | Couch et al. | 29—194 |
| 3,205,121 | 9/1965 | Eichler et al. | |
| 3,350,180 | 10/1967 | Croll | 117—71 X |
| 3,353,986 | 11/1967 | Mathias et al. | 117—71 X |
| 3,379,556 | 4/1968 | Chiecchi | 117—71 X |
| 3,393,982 | 7/1968 | Fisher et al. | 117—71 X |
| 3,411,910 | 11/1968 | Crawford et al. | 117—47 X |
| 3,414,430 | 12/1968 | Maho | 117—71 |

WILLIAM D. MARTIN, Primary Examiner

B. D. PIANALTO, Assistant Examiner

U.S. Cl. X.R.

29—194, 195; 96—48; 117—237, 239, 240